United States Patent
Kasai et al.

(10) Patent No.: US 10,836,567 B2
(45) Date of Patent: Nov. 17, 2020

(54) PULVERIZED-FUEL SUPPLY UNIT AND METHOD, AND INTEGRATED GASIFICATION COMBINED CYCLE

(71) Applicant: MITSUBISHI HITACHI POWER SYSTEMS, LTD., Yokohama (JP)

(72) Inventors: Jun Kasai, Kanagawa (JP); Koji Nishimura, Kanagawa (JP); Yuichiro Urakata, Kanagawa (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 227 days.

(21) Appl. No.: 16/077,589

(22) PCT Filed: Jan. 23, 2017

(86) PCT No.: PCT/JP2017/002157
§ 371 (c)(1),
(2) Date: Aug. 13, 2018

(87) PCT Pub. No.: WO2017/141632
PCT Pub. Date: Aug. 24, 2017

(65) Prior Publication Data
US 2019/0055485 A1  Feb. 21, 2019

(30) Foreign Application Priority Data
Feb. 17, 2016 (JP) .................... 2016-028132

(51) Int. Cl.
*B65D 88/26* (2006.01)
*C10J 3/30* (2006.01)
(Continued)

(52) U.S. Cl.
CPC ............. *B65D 88/26* (2013.01); *B65D 88/28* (2013.01); *B65D 88/703* (2013.01); *B65D 88/72* (2013.01);
(Continued)

(58) Field of Classification Search
CPC ........ B65G 53/04; B65G 53/40; B65G 53/36; B65G 53/38; B65G 53/66;
(Continued)

(56) References Cited

U.S. PATENT DOCUMENTS 2,582,710 A * 1/1952 Martin .................... C10B 49/10
48/206
2,607,666 A * 8/1952 Martin ....................... C10J 3/00
48/62 R
(Continued)

FOREIGN PATENT DOCUMENTS

EP  0 406 994 A1  1/1991
JP  H3-43608  2/1991
(Continued)

OTHER PUBLICATIONS

Notification of Reasons for Refusal dated Dec. 3, 2019, issued in counterpart JP Application No. 2016-028132, with English translation. (4 pages).
(Continued)

*Primary Examiner* — Alain Chau
(74) *Attorney, Agent, or Firm* — Westerman, Hattori, Daniels & Adrian, LLP (57) ABSTRACT

A pulverized-fuel supply unit includes a hopper, first nozzles, second nozzles, a pressurizing-gas supply device, a fluidization-gas supply device, and a pulverized-fuel supply line. The hopper has a hollow to store therein pulverized fuel. The first nozzles are provided to the hopper. The second nozzles are provided to a vertically lower part of the hopper below the plurality of first nozzles. The pressurizing-gas supply device is configured to supply pressurizing gas to increase internal pressure of the hopper. The fluidization-gas supply device is configured to supply fluidization gas to fluidize the pulverized fuel in the hopper. The pulverized-fuel supply line is provided to a vertically lower part of the
(Continued)

hopper. The pressurizing-gas supply device supplies pressurizing gas to the first nozzles and the second nozzles. The fluidization-gas supply device supplies fluidization gas to the second nozzles.

7 Claims, 4 Drawing Sheets

(51) Int. Cl.
| | |
|---|---|
| *F23K 3/02* | (2006.01) |
| *C10J 3/72* | (2006.01) |
| *C10J 3/50* | (2006.01) |
| *B65D 88/72* | (2006.01) |
| *B65D 88/28* | (2006.01) |
| *F01K 23/10* | (2006.01) |
| *B65D 88/70* | (2006.01) |

(52) U.S. Cl.
CPC . *C10J 3/30* (2013.01); *C10J 3/50* (2013.01); *C10J 3/506* (2013.01); *C10J 3/723* (2013.01); *F01K 23/10* (2013.01); *F23K 3/02* (2013.01); C10J 2200/15 (2013.01); C10J 2200/156 (2013.01); C10J 2300/0906 (2013.01); C10J 2300/0936 (2013.01); C10J 2300/1653 (2013.01); C10J 2300/1671 (2013.01); C10J 2300/1675 (2013.01); C10J 2300/1678 (2013.01); C10J 2300/1687 (2013.01); Y02E 20/18 (2013.01)

(58) Field of Classification Search
CPC .......... C10J 2300/093; C10J 2300/0936; C10J 2300/1653; C10J 2300/1671; C10J 2300/1675; C10J 2200/00; C10J 2300/15; C10J 3/30; C10J 3/50; C10J 3/506; C10J 3/723; C10J 2300/156; Y02E 20/18; B65D 88/26; B65D 88/28; B65D 88/30; B65D 88/32; B65D 88/70; B65D 88/703; B65D 88/706; B65D 88/72; F01K 23/067; F01K 23/10; F23K 3/02
USPC ....... 406/136–138; 222/195, 400.5; 221/174; 239/143; 366/101
See application file for complete search history.

(56) References Cited

U.S. PATENT DOCUMENTS

| | | | | |
|---|---|---|---|---|
| 3,393,944 A * | 7/1968 | Reintjes | .................. | C10J 3/466 406/109 |
| 3,647,188 A * | 3/1972 | Solt | ...................... | B01F 13/025 366/107 |
| 3,720,351 A | 3/1973 | Coulter et al. | | |
| 3,890,111 A * | 6/1975 | Knudsen | .................... | C10J 3/74 48/197 R |
| 4,017,272 A * | 4/1977 | Anwer | ...................... | C10J 3/54 48/197 R |
| 4,599,092 A * | 7/1986 | Eichelsbacher | ............ | C10J 3/32 48/197 R |
| 4,744,969 A * | 5/1988 | Marten | .................... | C10K 1/02 423/541.1 |
| 4,830,545 A * | 5/1989 | Salter | ........................ | B01J 3/02 406/12 |
| 4,883,390 A * | 11/1989 | Reintjes | ................. | B65G 53/12 406/24 |
| 4,934,876 A * | 6/1990 | Dirkse | ................... | B01J 8/0015 406/124 |
| 4,941,779 A * | 7/1990 | Dewitz | ...................... | B01J 3/02 222/195 |
| 4,943,190 A * | 7/1990 | Dewitz | .................. | B01J 8/0015 406/134 |
| 5,106,240 A * | 4/1992 | Dirkse | ................... | B01J 8/0015 222/198 |
| 5,127,772 A * | 7/1992 | Dewitz | ...................... | C10J 3/50 406/93 |
| 5,129,766 A * | 7/1992 | Dirkse | ........................ | C10J 3/50 406/136 |
| 6,161,490 A * | 12/2000 | Fujinami | .................. | C10J 3/482 110/213 |
| 7,810,310 B2 * | 10/2010 | Yoshida | .................... | F02C 3/28 60/39.464 |
| 8,377,387 B2 | 2/2013 | Dinu et al. | | |
| 8,951,314 B2 * | 2/2015 | Leininger | ................. | C10J 3/506 48/62 R |
| 9,266,688 B2 * | 2/2016 | Hu | .......... | B65G 53/40 |
| 9,388,349 B2 * | 7/2016 | Koyama | .................. | C10J 3/506 |
| 2008/0134658 A1 * | 6/2008 | Yoshida | ................ | F01K 23/068 60/39.12 |
| 2008/0141647 A1 * | 6/2008 | Yoshida | .................... | F02C 3/28 60/39.12 |
| 2008/0222956 A1 * | 9/2008 | Tsangaris | ................. | C10J 3/721 48/77 |
| 2009/0107046 A1 * | 4/2009 | Leininger | .................. | C10J 3/46 48/86 R |
| 2009/0173080 A1 * | 7/2009 | Wallace | ................ | F01K 23/068 60/780 |
| 2009/0173081 A1 * | 7/2009 | Wallace | ..................... | F02C 3/22 60/801 |
| 2010/0322721 A1 * | 12/2010 | Hamel | ................... | B65D 88/70 406/146 |
| 2011/0110729 A1 * | 5/2011 | Schultz | .................. | B65G 53/66 406/14 |
| 2011/0318234 A1 * | 12/2011 | Dinu | ......................... | F02C 3/28 422/139 |
| 2012/0082517 A1 * | 4/2012 | Hu | ......................... | B65G 53/16 406/136 |
| 2012/0325129 A1 * | 12/2012 | Frisch | ..................... | C10J 3/506 110/188 |
| 2014/0231239 A1 * | 8/2014 | Koyama | .................. | B65G 53/18 202/261 |
| 2014/0250786 A1 * | 9/2014 | Koyama | ................... | C10K 1/02 48/128 |

FOREIGN PATENT DOCUMENTS

| | | |
|---|---|---|
| JP | 9-324206 A | 12/1997 |
| JP | 2000-119666 A | 4/2000 |
| JP | 2001-003106 A | 1/2001 |
| JP | 2002-308446 A | 10/2002 |
| JP | 2007-223721 A | 9/2007 |
| JP | 2009-2566090 A | 11/2009 |
| JP | 2012-162660 A | 8/2012 |
| JP | 2012-218860 A | 11/2012 |
| JP | 2014-227191 A | 12/2014 |

OTHER PUBLICATIONS

Notification of Reasons for Refusal dated Nov. 26, 2019, issued in counterpart JP Application No. 2016-028132 with English translation. (4 pages).
International Search Report dated Mar. 28, 2017, issued in counterpart International Application No. PCT/JP2017/002157 (2 pages).

* cited by examiner

PULVERIZED-FUEL SUPPLY UNIT AND METHOD, AND INTEGRATED GASIFICATION COMBINED CYCLE

FIELD

The present invention relates to a pulverized-fuel supply unit and a pulverized-fuel supplying method for supplying pulverized fuel to a gasification unit that gasifies a carbonaceous feedstock such as coal or biomass to generate fuel gas, and an integrated gasification combined cycle including the pulverized-fuel supply unit.

BACKGROUND

As a conventional gasification unit, a carbonaceous-fuel gasification unit (coal gasification unit) is known that supplies a carbonaceous feedstock such as coal into a gasifier, and partially burns and gasifies the carbonaceous feedstock to generate flammable gas. An integrated gasification combined cycle including the carbonaceous-fuel gasification unit (integrated coal gasification combined cycle) includes a coal feeding unit, a pulverized-coal supply unit, a coal gasification unit, a gas clean-up unit, a gas turbine unit, a steam turbine unit, a heat recovery steam generator, and a gas purifier. As the coal gasification unit in this integrated coal gasification combined cycle, a tower-type coal gasification unit may be used that includes a gasifier disposed in a pressure vessel, a firing unit disposed below the gasifier in the vertical direction, and a heat exchanger (syngas cooler) disposed above the gasifier in the vertical direction. The pulverized-coal supply unit is an apparatus configured to supply pulverized coal to the coal gasification unit, which discharges pulverized coal stored in a pulverized-coal bin to a pulverized-coal supply hopper, supplies pressurizing gas to the pulverized-coal supply hopper to apply pressure thereto, and then supplies fluidization gas thereto to feed the pulverized coal to the gasifier of the coal gasification unit. Examples of this pulverized-coal supply unit include those described in Patent Literatures 1 and 2.

CITATION LIST

Patent Literature

Patent Literature 1: Japanese Patent Application Laid-open No. 09-324206
Patent Literature 2: Japanese Patent Application Laid-open No. 2000-119666

SUMMARY

Technical Problem

In such a conventional pulverized-coal supply unit, supply lines for nitrogen gas include two types of a pressurizing-gas supply line and a fluidization-gas supply line. When pressure is applied into the pulverized-coal supply hopper, a higher flow rate of nitrogen gas (pressurizing gas) is supplied to the pulverized-coal supply hopper through the pressurizing-gas supply line in a short time. When the pulverized coal in the pulverized-coal supply hopper is fluidized, a lower flow rate of nitrogen gas (fluidization gas) is supplied to the pulverized-coal supply hopper. At this time, the nitrogen gas for fluidization is supplied from a fluidization chamber at a lower part of the pulverized-coal supply hopper, and thus there are occasions when required part of the pulverized coal in the pulverized-coal supply hopper is not fluidized. As measures to solve this problem, a cone portion of the pulverized-coal supply hopper may be provided with a plurality of nozzles disposed at predetermined intervals, and each nozzle may inject nitrogen gas supplied from the corresponding supply line into the pulverized-coal supply hopper. However, it has been found that required part of the pulverized coal cannot be fluidized when pulverized coal is continuously supplied from the pulverized-coal supply hopper to the gasifier, the pulverized coal in the pulverized-coal supply hopper decreases, and the height of stored pulverized coal becomes low. This situation occurs because nitrogen gas supplied in a vertically upper part of the cone portion passes through the pulverized coal to flow out vertically upward. In this case, there is a possibility that pulverized coal in the pulverized-coal supply hopper cannot be sufficiently fluidized by the nitrogen gas supplied as fluidization gas, the pulverized coal cannot be discharged smoothly, and consequently a required amount of pulverized coal cannot be supplied to the gasifier.

The present invention has been made to solve the above-described problems, and an object of the present invention is to provide a pulverized-fuel supply unit and a method, and an integrated gasification combined cycle that are capable of supplying a required amount of pulverized fuel to a gasifier by using fluidization gas to fluidize pulverized fuel in a hopper.

Solution to Problem

To achieve the object, a pulverized-fuel supply unit of the present invention includes a hopper having a hollow to store therein pulverized fuel; a plurality of first nozzles provided to the hopper; a plurality of second nozzles provided to a vertically lower part of the hopper below the plurality of first nozzles; a pressurizing-gas supply device configured to supply pressurizing gas to increase internal pressure of the hopper; a fluidization-gas supply device configured to supply fluidization gas to fluidize the pulverized fuel in the hopper; and a pulverized-fuel supply line provided to a vertically lower part of the hopper. The pressurizing-gas supply device supplies pressurizing gas to the plurality of first nozzles and the plurality of second nozzles. The fluidization-gas supply device supplies fluidization gas to the plurality of second nozzles.

Accordingly, when the pressurizing-gas supply device is activated, pressurizing gas is supplied from the first nozzles and the second nozzles into the hopper, and thus the internal pressure can be increased to a predetermined supply pressure in a short time. When the fluidization-gas supply device is activated with this supply pressure in the hopper being maintained, fluidization gas is supplied from the second nozzles into the lower part of the hopper, thus pulverized fuel in the hopper is fluidized, and this pulverized fuel can be conveyed to the pulverized-fuel supply line. During conveyance of this pulverized fuel, the fluidization gas is supplied only into the lower part of the hopper to which the pulverized-fuel supply line is connected. Thus, even when the amount of pulverized fuel in the hopper becomes small, the pulverized fuel in the hopper can be efficiently fluidized by the fluidization gas, and a required amount of pulverized fuel can be stably supplied to a gasifier.

In the pulverized-fuel supply unit of the present invention, a flow rate of gas supplied by the fluidization-gas supply device is lower than a flow rate of gas supplied by the pressurizing-gas supply device.

Accordingly, in order to increase the pressure in the hopper, a large amount of gas needs to be supplied in a shorter time because the waiting time is wanted to be reduced, while in order to fluidize pulverized fuel in the hopper, a small amount of gas needs to be supplied. In view of this, the pressurizing-gas supply device and the fluidization-gas supply device are provided as separate devices and the amount of nitrogen gas for fluidization is set small, and thus the waiting time and the amount of gas usage can be reduced, so that the pulverized fuel can be optimally supplied.

In the pulverized-fuel supply unit of the present invention, the hopper includes a body portion that has a cylindrical shape and a closed upper end; a cone portion that is coupled to a vertically lower part of the body portion and tapers vertically downward; and a chamber portion that is coupled to a vertically lower part of the cone portion and has a closed lower end. The plurality of first nozzles are arranged on a vertically upper part of the cone portion at predetermined intervals in a circumferential direction. The second nozzles are arranged, below the plurality of first nozzles, on a vertically lower part of the cone portion at predetermined intervals in the circumferential direction.

Accordingly, by providing the first and second nozzles in upper and lower two stages to the cone portion, pulverized fuel inside the hopper is prevented from adhering to a wall surface and stagnating, and fluidization gas is supplied into the lower part of the hopper by the second nozzles. Consequently, even when the amount of pulverized fuel in the hopper becomes small, the pulverized fuel can be efficiently fluidized, and a required amount of pulverized fuel can be supplied to the gasifier.

A pulverized-fuel supply unit of the present invention includes a hopper having a hollow shape to store therein pulverized fuel; a plurality of first nozzles provided to the hopper; a plurality of second nozzles provided to a vertically lower part of the hopper below the plurality of first nozzles; a pressurizing-gas supply device configured to supply pressurizing gas to increase internal pressure of the hopper; a fluidization-gas supply device configured to supply fluidization gas to fluidize the pulverized fuel in the hopper; and a pulverized-fuel supply line provided to a vertically lower part of the hopper. The pressurizing-gas supply device supplies pressurizing gas to the plurality of first nozzles and the plurality of second nozzles. The fluidization-gas supply device supplies fluidization gas to the plurality of first nozzles and the plurality of second nozzles. The pulverized-fuel supply unit includes a pulverized-fuel supply line provided to a lower part of the hopper; and a controller configured to cause the fluidization-gas supply device to stop injection of fluidization gas from the plurality of first nozzles when the amount of the pulverized fuel in the hopper decreases below a predetermined lower limit during conveyance of pulverized fuel from the hopper.

Accordingly, when the remaining amount of pulverized fuel is large, fluidization gas is injected from both the first nozzles and the second nozzles into the hopper, and thus a required amount of pulverized fuel can be efficiently fluidized to be stably supplied to the gasifier. When the remaining amount of pulverized fuel is small, fluidization gas is injected only from the second nozzles at the lower part into the hopper, and thus the fluidization gas can be prevented from passing through the pulverized fuel in the hopper and flowing out upward, and the pulverized fuel can be efficiently fluidized.

In the pulverized-fuel supply unit of the present invention, the fluidization-gas supply device includes a fluidization-gas supply line; a first fluidization-gas supply line that branches off from the fluidization-gas supply line and is connected to the plurality of first nozzles; a first open/close valve provided to the first fluidization-gas supply line; a second fluidization-gas supply line that branches off from the fluidization-gas supply line and is connected to the plurality of second nozzles; and a second open/close valve provided to the second fluidization-gas supply line. The controller opens the first open/close valve and the second open/close valve when the amount of the pulverized fuel in the hopper is equal to or larger than the lower limit, and closes the first open/close valve when the amount of the pulverized fuel in the hopper decreases below the lower limit.

Accordingly, by providing the fluidization-gas supply lines and the open/close valves for the first nozzles and the second nozzles on a dedicated basis, the injection amount of fluidization gas can be easily changed depending on the remaining amount of pulverized fuel in the hopper.

A pulverized-fuel supplying method of the present invention is performed in a pulverized-fuel supply unit that includes a hopper having a hollow shape to store therein pulverized fuel; a plurality of first nozzles provided to the hopper; a plurality of second nozzles provided to a vertically lower part of the hopper below the plurality of first nozzles; a pressurizing-gas supply device configured to supply pressurizing gas to increase internal pressure of the hopper; a fluidization-gas supply device configured to supply fluidization gas to fluidize the pulverized fuel in the hopper; and a pulverized-fuel supply line provided to a vertically lower part of the hopper, the pressurizing-gas supply device supplying pressurizing gas to the first nozzles and the second nozzles, the fluidization-gas supply device supplying fluidization gas to the second nozzles. The method includes the steps of: activating the pressurizing-gas supply device when pressure is applied into the hopper; and activating the fluidization-gas supply device when the pulverized fuel is conveyed from the hopper.

Accordingly, during conveyance of pulverized fuel, fluidization gas is supplied only into the lower part of the hopper to which the pulverized-fuel supply line is connected. Consequently, even when the amount of pulverized fuel in the hopper becomes small, the pulverized fuel in the hopper can be efficiently fluidized by the fluidization gas, and a required amount of pulverized fuel can be stably supplied to the gasifier.

An integrated gasification combined cycle of the present invention includes the pulverized-fuel supply unit to supply pulverized fuel obtained by pulverizing carbonaceous feedstock; a gasification unit configured to gasify the pulverized fuel supplied from the pulverized-fuel supply unit to generate flammable gas; a gas clean-up unit configured to remove impurities from the flammable gas generated by the gasification unit to clean the gas; a gas turbine unit configured to burn mixed gas of compressed air and at least part of the flammable gas cleaned by the gas clean-up unit to rotate and drive a turbine; a heat recovery steam generator configured to generate steam by using flue gas from the gas turbine unit; and a steam turbine unit configured to rotate and drive a turbine by using the steam generated by the heat recovery steam generator.

Accordingly, in the pulverized-fuel supply unit, during conveyance of pulverized fuel, fluidization gas is supplied only into the lower part of the hopper to which the pulverized-fuel supply line is connected. Thus, even when the amount of the pulverized fuel in the hopper becomes small, the pulverized fuel in the hopper can be efficiently fluidized by the fluidization gas, and a required amount of pulverized fuel can be stably supplied to the gasifier. Consequently, the gasification unit can be stably operated.

Advantageous Effects of Invention

According to the pulverized-fuel supply unit and method, and the integrated gasification combined cycle of the present invention, during conveyance of pulverized fuel, fluidization gas is supplied only into the lower part of the hopper, and thus even when the amount of pulverized fuel in the hopper becomes small, the pulverized fuel in the hopper can be efficiently fluidized by the fluidization gas, and a required amount of pulverized fuel can be supplied to the gasifier.

DESCRIPTION OF EMBODIMENTS

A preferred embodiment of pulverized-fuel supply unit and method, and integrated gasification combined cycle according to the present invention will now be described in detail with reference to the accompanying drawings. It should be noted that the present invention is not limited by this embodiment, and when a plurality of embodiments are described, the present invention includes any combination of the embodiments.

First Embodiment

Figure 3:
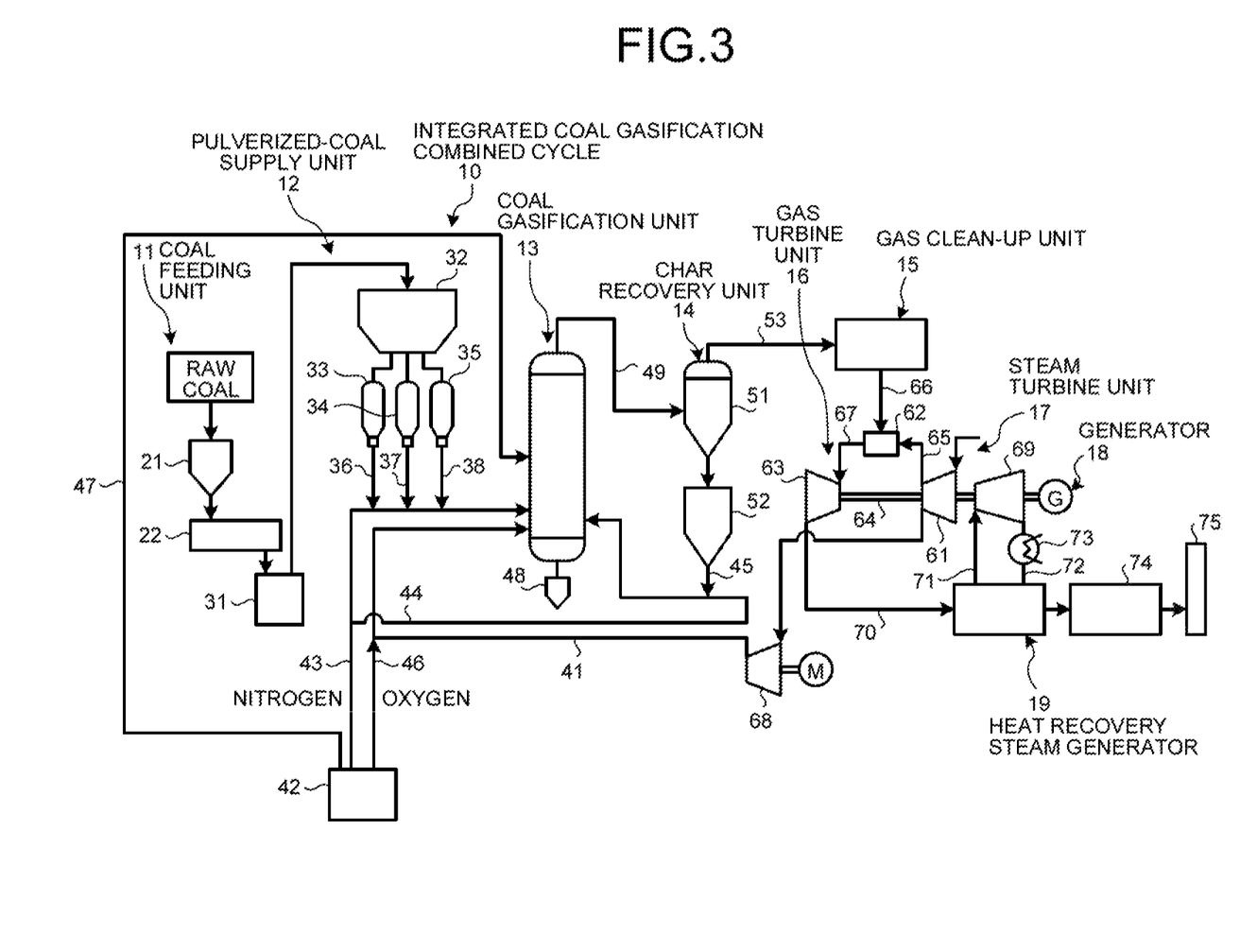
FIG. 3 is a schematic configuration diagram illustrating an integrated coal gasification combined cycle in which the pulverized-fuel supply unit of the first embodiment is used.

FIG. 3 is a schematic configuration diagram illustrating an integrated coal gasification combined cycle in which a pulverized-fuel supply unit of a first embodiment is used.

The integrated coal gasification combined cycle (IGCC) of the first embodiment uses an air-fired type that uses air as an oxygen containing gas to generate coal gas with a gasification unit, and supplies coal gas purified by a gas clean-up unit as fuel gas to a gas turbine unit to generate power. In other words, the integrated coal gasification combined cycle of the first embodiment is an air-fired type (air-blown) power plant.

In the first embodiment, as depicted in FIG. 3, the integrated coal gasification combined cycle (integrated gasification combined cycle) 10 includes, a coal feeding unit 11, a pulverized-coal supply unit (pulverized-fuel supply unit) 12, a coal gasification unit 13, a char recovery unit 14, a gas clean-up unit 15, a gas turbine unit 16, a steam turbine unit 17, a generator 18, and a heat recovery steam generator (HRSG) 19.

The coal feeding unit 11 uses coal, for example, being carbonaceous feedstock, and includes a raw-coal bunker 21 and a coal feeder 22. The raw-coal bunker 21 can store coal and can feed a predetermined amount of coal to the coal feeder 22. The coal feeder 22 conveys coal fed from the raw-coal bunker 21 with a conveyor, for example, and can feed the coal to the pulverized-coal supply unit 12.

The pulverized-coal supply unit 12 includes a coal pulverizer (crusher/mill) 31. This coal pulverizer 31 is a coal crusher configured to pulverize coal into small particles to produce pulverized coal (pulverized fuel). In other words, the coal pulverizer 31 is a machine that pulverizes raw coal fed by the coal feeding unit 11 into coal having a predetermined particle diameter or smaller, that is, pulverized coal. The pulverized-coal supply unit 12 includes a pulverized-coal bin 32 that stores pulverized coal produced by the coal pulverizer 31 and a plurality of (three in the present embodiment) pulverized-coal supply hoppers 33, 34, and 35 that supply pulverized coal to the coal gasification unit 13. Thus, pulverized coal pulverized by the coal pulverizer 31 is separated from conveyance gas, is then stored in the pulverized-coal bin 32, and is supplied to each of the pulverized-coal supply hopper 33, 34, and 35.

Pulverized coal produced by the pulverized-coal supply unit 12 is supplied to the coal gasification unit 13 with nitrogen as a conveyance inert gas supplied from an air separation unit 42 described later. The inert gas herein is inert gas that contains oxygen at about 5 vol % or less, and representative examples thereof include nitrogen gas, carbon dioxide gas, and argon gas. However, the oxygen content is not necessarily limited to about 5% or less.

The coal gasification unit 13 can supply pulverized coal processed by the pulverized-coal supply unit 12, and also can recycle char (unreacted contents and ash contents of coal) recovered by the char recovery unit 14.

Specifically, to the coal gasification unit 13, a compressed-air supply line 41 is connected from the gas turbine unit 16 (compressor 61), and compressed air compressed by the gas turbine unit 16 can be supplied thereto. The air separation unit 42 is a unit that separates and generates nitrogen and oxygen from air in the atmosphere. A first nitrogen supply line 43 is connected to the coal gasification unit 13, and to this first nitrogen supply line 43, coal supply lines 36, 37, and 38 from the pulverized-coal supply hoppers 33, 34, and 35 are connected. A second nitrogen supply line 44 is connected also to the coal gasification unit 13, and to this second nitrogen supply line 44, a char return line 45 from the char recovery unit 14 is connected. Furthermore, an oxygen supply line 46 is connected to the compressed-air supply line 41. In this case, nitrogen is used as conveyance gas for coal and char, and oxygen is used as an oxygen containing gas. The coal gasification unit 13 includes a gasifier (not depicted) accommodated in a pressure vessel, and a nitrogen supply line 47 for supplying nitrogen gas is provided to an annulus portion between the gasifier and the pressure vessel.

The coal gasification unit 13 includes the gasifier of a two-stage entrained flow-type, for example, and partially burns coal (pulverized coal) as carbon-containing fuel supplied thereinto with an oxygen containing gas (air, oxygen) for gasification to generate flammable gas (raw syngas, coal gas). The coal gasification unit 13 is provided with a foreign-matter removal device 48 that removes foreign matter included in pulverized coal. In this case, the coal gasification unit 13 is not limited to an entrained flow gasifier, and may be a fluidized bed gasifier or a fixed bed gasifier. The coal gasification unit 13 is provided with a gas generation line 49 for flammable gas extending toward the char recovery unit 14, and can discharge flammable gas containing char. In this case, by providing a gas cooler to the gas generation line 49, flammable gas may be cooled to a predetermined temperature to be supplied to the char recovery unit 14.

The char recovery unit 14 includes a dust collector 51 and a supply hopper 52. In this case, the dust collector 51 includes one or more porous filters and a cyclone, and can separate char that is contained in flammable gas generated by the coal gasification unit 13. The flammable gas from which the char has been separated is sent to the gas clean-up unit 15 through a gas discharge line 53. The supply hopper 52 is a hopper that stores the char separated from the flammable gas by the dust collector 51. A bin may be disposed between the dust collector 51 and the supply hopper 52, and the supply hopper 52 may be provided in plurality so as to be connected to this bin. The char return line 45 from the supply hopper 52 is connected to the second nitrogen supply line 44.

The gas clean-up unit 15 is a unit that removes impurities such as a sulfur compound and a nitrogen compound from the flammable gas from which char has been removed by the char recovery unit 14 to purify the gas. The gas clean-up unit 15 then purifies the flammable gas to produce fuel gas and supplies this fuel gas to the gas turbine unit 16. The flammable gas from which the char has been removed by this gas clean-up unit 15 still contains sulfur content (e.g., $H_2S$), which is removed and recovered with an amine absorbing solution to be efficiently utilized.

The gas turbine unit 16 includes a compressor 61, a combustor 62, and a turbine 63. The compressor 61 and the turbine 63 are coupled by a rotating shaft 64. To the combustor 62, a compressed-air supply line 65 is connected from the compressor 61, and also a fuel gas supply line 66 is connected from the gas clean-up unit 15. A combustion gas supply line 67 is connected to the turbine 63. The gas turbine unit 16 is provided with the compressed-air supply line 41 that extends from the compressor 61 to the coal gasification unit 13, and at a midpoint of this line, a booster 68 is provided. Thus, in the combustor 62, compressed air supplied from the compressor 61 is mixed with fuel gas supplied from the gas clean-up unit 15, and this mixed gas is burnt. By combustion gas thus generated, the rotating shaft 64 is rotated and driven in the turbine 63, and thus the generator 18 can be rotated and driven.

The steam turbine unit 17 includes a turbine 69 that is coupled to the rotating shaft 64 in the gas turbine unit 16, and the generator 18 is coupled to a base end of this rotating shaft 64. The heat recovery steam generator 19 is a unit provided to a flue gas line 70 from the gas turbine unit 16 (turbine 63) and configured to exchange heat between supplied water and hot flue gas to generate steam. Thus, between the heat recovery steam generator 19 and the turbine 69 of the steam turbine unit 17, a steam supply line 71 is provided, and also a steam recovery line 72 is provided. The steam recovery line 72 is provided with a condenser 73.

Steam to be generated by the heat recovery steam generator 19 may contain steam that has been generated through heat exchange with raw syngas by a heat exchanger (not depicted) of the coal gasification unit 13 and has been further subjected to heat exchange in the heat recovery steam generator 19. Thus, in the steam turbine unit 17, the turbine 69 is rotated and driven by steam supplied by the heat recovery steam generator 19, the rotating shaft 64 is accordingly rotated and driven, and thus the generator 18 can be rotated and driven. Between an outlet of the heat recovery steam generator 19 and a stack 75, a gas purifier 74 is provided.

In the integrated coal gasification combined cycle (integrated gasification combined cycle) 10 configured as described above, coal in the raw-coal bunker 21 is fed by the coal feeder 22 of the coal feeding unit 11 to the coal pulverizer 31, the coal pulverizer 31 pulverizes the coal into small particles to produce pulverized coal, and the pulverized coal is stored in the pulverized-coal bin 32. The pulverized coal stored in the pulverized-coal bin 32 is sequentially supplied to the three pulverized-coal supply hoppers 33, 34, and 35, and is supplied to the coal gasification unit 13 through the first nitrogen supply line 43 with nitrogen supplied from the air separation unit 42. Meanwhile, char recovered by the char recovery unit 14 is supplied to the coal gasification unit 13 through the second nitrogen supply line 44 with nitrogen supplied from the air separation unit 42. Furthermore, compressed air bled from the gas turbine unit 16 is increased in pressure by the booster 68 and is then supplied to the coal gasification unit 13 through the compressed-air supply line 41 together with oxygen supplied from the air separation unit 42.

The coal gasification unit 13 burns the pulverized coal and the char thus supplied with the compressed air (oxygen) to gasify the pulverized coal and the char, thereby generating flammable gas (coal gas). This flammable gas is then discharged from the coal gasification unit 13 through the gas generation line 49 and is sent to the char recovery unit 14. In the char recovery unit 14, fine particles of char are separated from the flammable gas by the dust collector 51, and flammable gas from which char has been separated is sent to the gas clean-up unit 15 through the gas discharge line 53. Meanwhile, the fine particles of char that have been separated from the flammable gas are accumulated in the supply hopper 52 and are returned to the coal gasification unit 13 through the char return line 45 to be recycled.

The flammable gas from which char has been separated is purified in the gas clean-up unit 15 by removing impurities such as a sulfur compound and a nitrogen compound, and thus fuel gas is produced. In the gas turbine unit 16, when the compressor 61 generates and supplies compressed air to the combustor 62, this combustor 62 mixes compressed air supplied from the compressor 61 with fuel gas fed from the gas clean-up unit 15 and burns this mixed gas to generate combustion gas. The turbine 63 is rotated and driven by this combustion gas, and thus the generator 18 is rotated and driven via the rotating shaft 64 to generate electric power.

Flue gas that has been discharged from the turbine 63 of the gas turbine unit 16 is subjected to heat exchange with supplied water in the heat recovery steam generator 19, and thus steam is generated. This generated steam is supplied to the steam turbine unit 17. The steam turbine unit 17 rotates and drives the turbine 69 by using the steam supplied from the heat recovery steam generator 19, thereby rotating and driving the generator 18 via the rotating shaft 64 to generate electric power. The gas purifier 74 removes hazardous substances from exhaust gas discharged from the heat recovery steam generator 19, and flue gas thus cleaned is released to the atmosphere from the stack 75. Herein, the gas turbine unit 16 and the steam turbine unit 17 do not have to share the same shaft to rotate and drive the single generator 18, and may have separate shafts to rotate and drive a plurality of generators.

Figure 1:
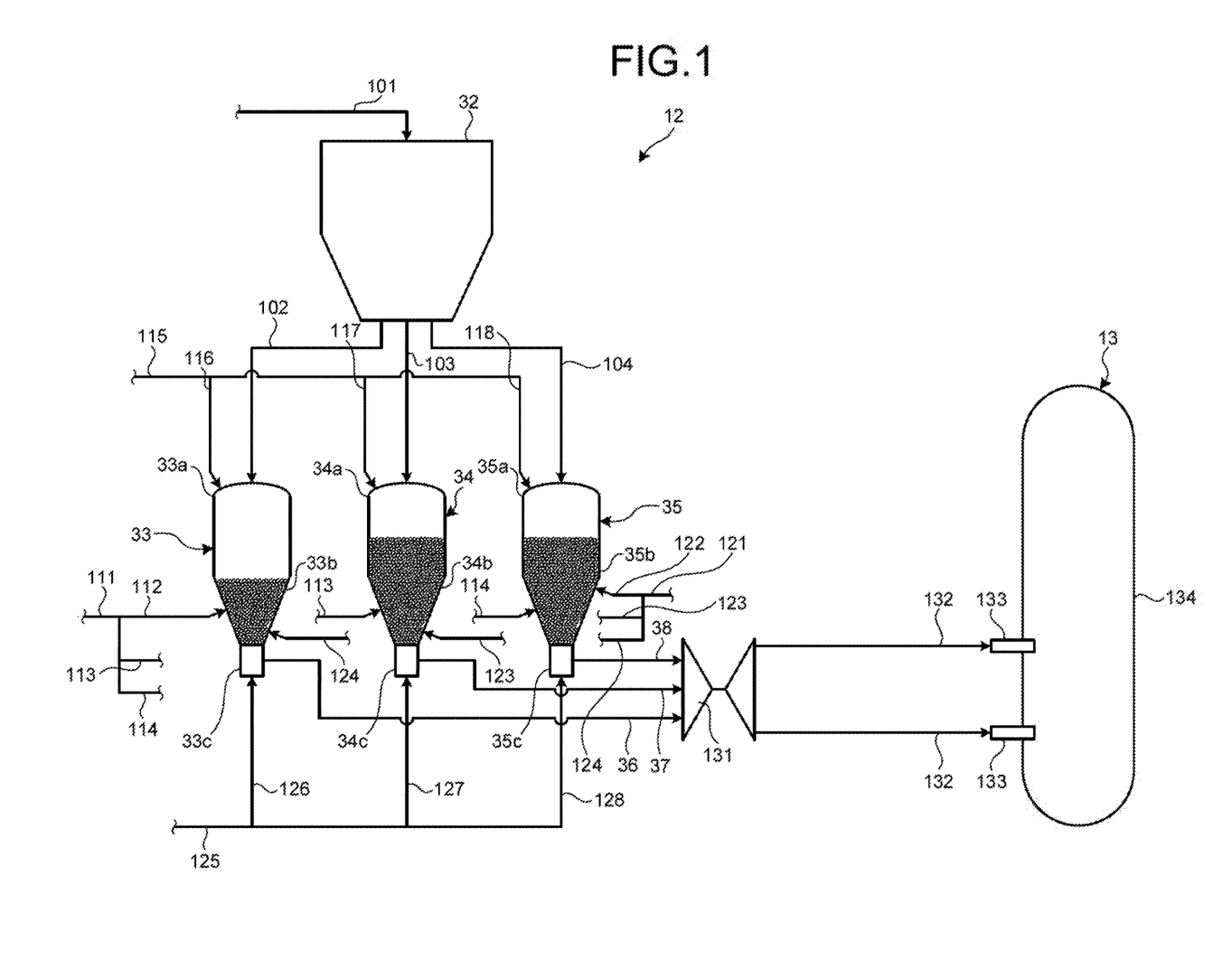
FIG. 1 is a schematic configuration diagram illustrating a pulverized-fuel supply unit of a first embodiment.

The following describes in detail the pulverized-coal supply unit 12 in the above-described integrated coal gasification combined cycle 10. FIG. 1 is a schematic configuration diagram illustrating the pulverized-fuel supply unit of the first embodiment.

As depicted in FIG. 1, this pulverized-coal supply unit 12 includes the coal pulverizer 31 (see FIG. 3), the pulverized-coal bin 32, and three pulverized-coal supply hoppers (pulverized fuel supply hoppers) 33, 34, and 35. To the vertically upper end of the pulverized-coal bin 32, a pulverized coal line 101 is connected. The pulverized-coal bin, to which pulverized coal generated by the coal pulverizer 31 is fed with conveyance inert gas such as nitrogen through the pulverized coal line 101, can store therein the pulverized coal. The number of the pulverized-coal supply hoppers may be any number of two or more.

The pulverized-coal supply hoppers 33, 34, and 35 have the same shape, and respectively have body portions 33a, 34a, and 35a, cone portions 33b, 34b, and 35b, and chamber portions 33c, 34c, and 35c. The vertically upper ends of the body portions 33a, 34a, and 35a are closed, and each body portion has a cylindrical shape the horizontal cross-sectional area of which is constant along the vertical direction. The cone portions 33b, 34b, and 35b are respectively located under the body portions 33a, 34a, and 35a in the vertical direction, and each cone portion has a conical shape the horizontal cross-sectional of which decreases vertically downward. The chamber portions 33c, 34c, and 35c, the vertically lower ends of which are closed, are respectively located under the cone portions 33b, 34b, and 35b in the vertical direction. Each chamber portion has a cylindrical shape the horizontal cross-sectional area of which is constant along the vertical direction.

The pulverized-coal supply hoppers 33, 34, and 35 are disposed in parallel below the pulverized-coal bin 32 in the vertical direction and are coupled to the pulverized-coal bin 32 via pulverized-coal discharge lines 102, 103, and 104, respectively. Thus, when supply hopper inlet valves (not depicted) are opened, pulverized coal in the pulverized-coal bin 32 can be discharged to the pulverized-coal supply hoppers 33, 34, and 35 through the pulverized-coal discharge lines 102, 103, and 104, respectively.

To vertically lower parts of the chamber portions 33c, 34c, and 35c of the pulverized-coal supply hoppers 33, 34, and 35, coal supply lines (pulverized-fuel supply lines) 36, 37, and 38 are respectively coupled. Thus, when supply hopper outlet valves (not depicted) are opened, pulverized coal in the pulverized-coal supply hoppers 33, 34, and 35 can be supplied to a burner 133 of the coal gasification unit 13 through the coal supply lines 36, 37, and 38, respectively.

The pulverized-coal supply hoppers 33, 34, and 35 are provided with a gas supply device that supplies gas thereinto to increase the pressure therein to a predetermined pressure. The predetermined pressure is a pressure set such that the pressure in each of the pulverized-coal supply hoppers 33, 34, and 35 is higher than the pressure in the gasifier 134, and needed at a later step for discharging pulverized coal from the pulverized-coal supply hoppers 33, 34, and 35 to feed the pulverized coal to the burner 133 of the gasifier 134 through the coal supply lines 36, 37, and 38, respectively. This gas supply device includes a pressurizing-gas supply device (pressurizing-gas supply line 111) for supplying nitrogen gas as pressurizing gas into the respective pulverized-coal supply hoppers 33, 34, and 35 and fluidization-gas supply devices (fluidization-gas supply lines 121 and 125) for supplying nitrogen gas as fluidization gas into the respective pulverized-coal supply hoppers 33, 34, and 35. The pressurizing-gas supply device (pressurizing-gas supply line 111) supplies nitrogen gas to the respective cone portions 33b, 34b, and 35b of the pulverized-coal supply hoppers 33, 34, and 35. The fluidization-gas supply devices (fluidization-gas supply lines 121 and 125) respectively supply nitrogen gas to the cone portions 33b, 34b, and 35b and the chamber portions 33c, 34c, and 35c of the pulverized-coal supply hoppers 33, 34, and 35. The nitrogen gas as pressurizing gas and fluidization gas may be supplied from nitrogen gas buffer tanks for the respective uses provided to the air separation unit 42 (see FIG. 3), for example. Herein, nitrogen gas is used as pressurizing gas and fluidization gas, but the present invention is not limited to this, and any inert gas may be used. Fluidization gas is supplied to areas where pulverized coal tends to stagnate in the pulverized-coal supply hoppers 33, 34, and 35, and thus the pulverized coal can be uniformly fluidized with a minimum amount of gas supply.

Specifically, one end of the pressurizing-gas supply line 111 is coupled to a pressurizing-gas tank (not depicted), and the other end thereof branches into three pressurizing-gas supply branch lines 112, 113, and 114, which are respectively coupled to the cone portions 33b, 34b, and 35b of the pulverized-coal supply hoppers 33, 34, and 35. Thus, nitrogen gas in the pressurizing-gas tank can be supplied to the respective cone portions 33b, 34b, and 35b of the pulverized-coal supply hoppers 33, 34, and 35 through the pressurizing-gas supply line 111 and the respective pressurizing-gas supply branch lines 112, 113, and 114 to apply pressure thereinto.

One end of a pressure-regulating-gas supply line 115 is coupled to a pressure-regulating-gas tank (not depicted) provided to an outlet of the air separation unit (see FIG. 3), for example, and the other end thereof branches into three pressure-regulating-gas supply branch lines 116, 117, and 118, which are respectively coupled to the upper ends of the body portions 33a, 34a, and 35a of the pulverized-coal supply hoppers 33, 34, and 35. Thus, nitrogen gas in the pressure-regulating-gas tank can be supplied to the respective body portions 33a, 34a, and 35a of the pulverized-coal supply hoppers 33, 34, and 35 through the pressure-regulating-gas supply line 115 and the respective pressure-regulating-gas supply branch lines 116, 117, and 118 to regulate the internal pressure.

One end of the fluidization-gas supply line 121 is coupled to a fluidization-gas tank (not depicted) provided to an outlet of the air separation unit 42 (see FIG. 3), for example, and the other end thereof branches into three fluidization-gas supply branch lines 122, 123, and 124, which are coupled to the cone portions 33b, 34b, and 35b of the pulverized-coal supply hoppers 33, 34, and 35. Thus, nitrogen gas in the fluidization-gas tank can be supplied to the respective cone portions 33b, 34b, and 35b of the pulverized-coal supply hoppers 33, 34, and 35 through the fluidization-gas supply line 121 and the respective fluidization-gas supply branch lines 122, 123, and 124 to fluidize pulverized coal.

One end of the fluidization-gas supply line 125 is coupled to the fluidization-gas tank (not depicted) provided to the outlet of the air separation unit 42 (see FIG. 3), for example, and the other end thereof branches into three fluidization-gas supply branch lines 126, 127, and 128, which are respectively coupled to the vertically lower ends of the chamber portions 33c, 34c, and 35c of the pulverized-coal supply hoppers 33, 34, and 35. Thus, nitrogen gas in the fluidization-gas tank can be supplied to the respective chamber portions 33c, 34c, and 35c of the pulverized-coal supply hoppers 33, 34, and 35 through the fluidization-gas supply line 125 and the respective fluidization-gas supply branch lines 126, 127, and 128 to fluidize and discharge pulverized coal to the coal supply lines 36, 37, and 38.

The distal ends of the respective coal supply lines 36, 37, and 38 from the pulverized-coal supply hoppers 33, 34, and 35 are coupled to a distributor 131, and the distributor 131 is coupled to the burner 133 provided in plurality via the corresponding pulverized-coal supply lines 132. Thus, pulverized coal in the respective pulverized-coal supply hoppers 33, 34, and 35 is supplied from the coal supply lines 36, 37, and 38 to the burners 133 through the distributor 131 and the pulverized-coal supply lines 132, and accordingly the burners 133 can supply the pulverized coal with nitrogen gas into the gasifier 134 included in the coal gasification unit 13.

The pressurizing-gas supply device (pressurizing-gas supply line 111) and the fluidization-gas supply device 121 are devices for supplying nitrogen gas to the respective cone portions 33b, 34b, and 35b of the pulverized-coal supply hoppers 33, 34, and 35, and these supply lines are separate but share one injection nozzle as described above.

Figure 2:
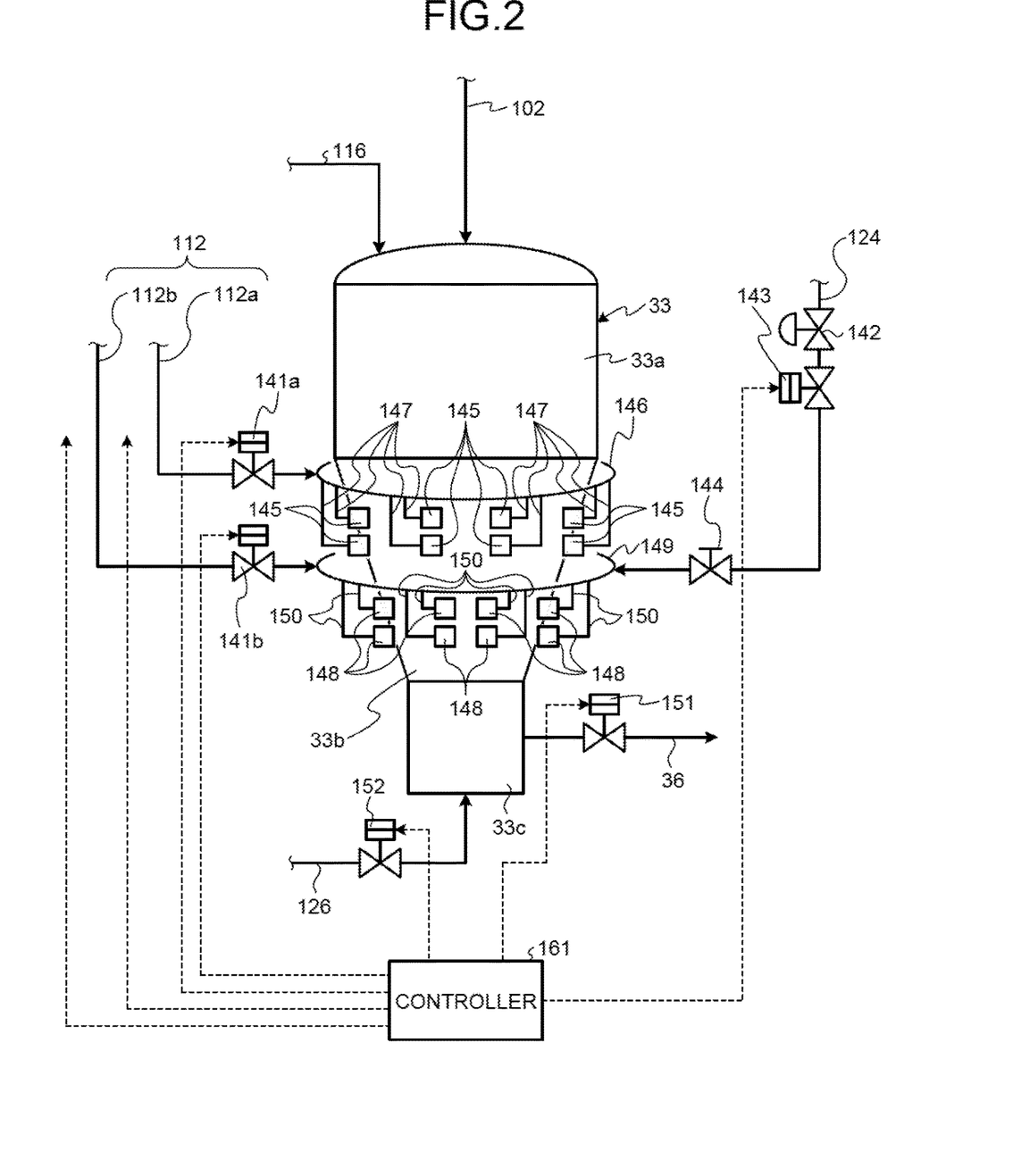
FIG. 2 is a schematic configuration diagram illustrating nitrogen-gas supply channels to a pulverized-coal supply hopper in the pulverized-fuel supply unit of the first embodiment.

The following describes nitrogen-gas supply channels to the pulverized-coal supply hoppers 33, 34, and 35 in detail. Because the pulverized-coal supply hoppers 33, 34, and 35 have approximately the same configuration, the pulverized-coal supply hopper 33 will be described herein. FIG. 2 is a schematic configuration diagram illustrating the nitrogen-gas supply channels to the pulverized-coal supply hopper 33 in the pulverized-fuel supply unit of the first embodiment.

As depicted in FIG. 2, the pressurizing-gas supply branch line 112 includes two pressurizing-gas supply branch lines 112a and 112b, and the pressurizing-gas supply branch lines 112a and 112b are respectively provided with pressurizing shut-off valves 141a and 141b each configured to start and stop supplying nitrogen gas to the cone portion 33b. The fluidization-gas supply branch line 124 is provided with a fluidization shut-off valve 143 configured to start and stop supplying nitrogen gas to the cone portion 33b. A fluidization open/close valve (manual valve) 144 may be omitted if it is not needed for operation of the plant. Furthermore, a fluidization flow regulating valve 142 is provided upstream thereof and may control the flow rate as required.

The pulverized-coal supply hopper 33 is provided with a plurality of first injection nozzles 145 and a plurality of second injection nozzles 148 on the cone portion 33b. The first injection nozzles 145 are disposed on an upper part of the cone portion 33b at predetermined intervals in the circumferential direction. The second injection nozzles 148 are disposed on a lower part of the cone portion 33b at predetermined intervals in the circumferential direction. In other words, on the cone portion 33b of the pulverized-coal supply hopper 33, the second injection nozzles 148 are disposed below the first injection nozzles 145 in the vertical direction. The respective injection nozzles 145 and 148 can inject nitrogen gas into the cone portion 33b.

Around an upper part of the cone portion 33b of the pulverized-coal supply hopper 33, a gas connecting line 146 having a ring shape is disposed. To the gas connecting line 146, the respective first injection nozzles 145 are coupled via the corresponding gas branch lines 147. Around a lower part of the cone portion 33b of the pulverized-coal supply hopper 33, a gas connecting line 149 having a ring shape is disposed. To the gas connecting line 149, the respective second injection nozzles 148 are coupled via the corresponding gas branch lines 150.

The pressurizing-gas supply branch line 112a is coupled to the gas connecting line 146, and the pressurizing-gas supply branch line 112b is coupled to the gas connecting line 149. The fluidization-gas supply branch line 122 is coupled to the gas connecting line 149. Thus, nitrogen gas as pressurizing gas from the pressurizing-gas supply branch line 112 is injected into the pulverized-coal supply hopper 33 from the first injection nozzles 145 and the second injection nozzles 148, and nitrogen gas as fluidization gas from the fluidization-gas supply branch line 124 is injected into the pulverized-coal supply hopper 33 only from the second injection nozzles 148 and is not injected from the first injection nozzles 145.

Thus, when the pressurizing shut-off valves 141a and 141b are opened, nitrogen gas in the pressurizing-gas tank is supplied to the respective first injection nozzles 145 and the respective second injection nozzles 148 through the pressurizing-gas supply line 111 (see FIG. 1) and the respective pressurizing-gas supply branch lines 112a and 112b, and can be injected into the cone portion 33b of the pulverized-coal supply hopper 33 from the respective first injection nozzles 145 and the respective second injection nozzles 148. At this time, the amount of nitrogen gas to be supplied into the cone portion 33b of the pulverized-coal supply hopper 33 from the respective first injection nozzles 145 and the respective second injection nozzles 148 may be adjusted by an orifice, for example, provided in a channel (not depicted) in advance so that the flow rate can be controlled.

When the fluidization shut-off valve 143 is opened, nitrogen gas in the fluidization-gas tank provided to the outlet of the air separation unit 42 (see FIG. 3), for example, is supplied to the respective second injection nozzles 148 through the fluidization-gas supply line 121 (see FIG. 1) and the fluidization-gas supply branch line 124, and can be injected only into the lower part of the cone portion 33b of the pulverized-coal supply hopper 33 from the respective second injection nozzles 148.

When the internal pressure of the pulverized-coal supply hopper 33 is increased after pulverized coal has been discharged therein, a large amount of nitrogen gas (pressurizing gas) needs to be supplied in a short time because the waiting time is wanted to be reduced. In view of this, diameters of pipes (pressurizing-gas supply branch lines 112, 112a, and 112b) for supplying the nitrogen gas are set large. By contrast, when pulverized coal in the pulverized-coal supply hopper 33 is fluidized to be supplied after the internal pressure therein has been increased to a predetermined supply pressure, only a small amount of nitrogen gas (fluidization gas) needs to be supplied because the nitrogen gas is wanted to be injected uniformly. In view of this, the diameter of a pipe (fluidization-gas supply branch line 124) for supplying the nitrogen gas is set small. Thus, the supply lines for nitrogen-gas include two types of the pressurizing-gas supply line 111 and the fluidization-gas supply line 121. By contrast, the injection nozzles 145 and 148 configured to inject nitrogen gas into the pulverized-coal supply hoppers 33, 34, and 35 have the same configuration to achieve commonality between pressurization use and fluidization use from viewpoints of arrangement constraints, structure simplification, and cost reduction, for example, and are provided to the cone portion 33b.

In the pulverized-coal supply unit 12 of the first embodiment, as depicted in FIG. 1 and FIG. 2, the coal pulverizer 31 (see FIG. 3) pulverizes coal to generate pulverized coal, which is stored in the pulverized-coal bin 32, and the pulverized coal stored in the pulverized-coal bin 32 is discharged to the respective pulverized-coal supply hoppers 33, 34, and 35. The three pulverized-coal supply hoppers 33, 34, and 35 are sequentially used to continuously supply the pulverized coal to the burners 133. In other words, pulverized coal in the pulverized-coal supply hopper 33 is supplied to the burners 133, and after the pulverized coal in the pulverized-coal supply hopper 33 has been depleted, pulverized coal in the pulverized-coal supply hopper 34 is supplied to the burners 133. While the pulverized coal in the pulverized-coal supply hopper 34 is being supplied to the burners 133, pulverized coal is discharged from the pulverized-coal bin 32 into the empty pulverized-coal supply hopper 33 in which pulverized coal has been depleted.

Specifically, the pressure in the empty pulverized-coal supply hopper 33 in which pulverized coal has been depleted is reduced to the atmospheric pressure by opening a pressure-reducing valve that communicates with a pressure-reducing discharge line (not depicted), and thus a predetermined amount of pulverized coal is discharged from the pulverized-coal bin 32 into the pulverized-coal supply hopper 33. Furthermore, the pressurizing shut-off valves 141a and 141b are opened to supply nitrogen gas from the pressurizing-gas supply line 111 and the pressurizing-gas supply branch line 112 into the cone portion 33b of the pulverized-coal supply hopper 33, and thus the pressure therein is increased. When a predetermined supply pressure is reached, the pressurizing shut-off valves 141a and 141b are closed. The fluidization shut-off valve 143 is also opened to supply nitrogen gas from the fluidization-gas supply line 121 and the fluidization-gas supply branch line 124 into the cone portion 33b of the pulverized-coal supply hopper 33, and thus pulverized coal therein is fluidized. Furthermore, the shut-off valves 151 and 152 are opened to supply nitrogen gas from the fluidization-gas supply line 125 and the fluidization-gas supply branch line 126 into the chamber portion 33c of the pulverized-coal supply hopper 33, and thus pulverized coal therein is fluidized to discharge the pulverized coal in the pulverized-coal supply hopper 33 with the nitrogen gas to the coal supply line 36.

Control of opening and closing various valves as described above is performed by a controller 161. In other words, as depicted in FIG. 2, opening and closing of the pressurizing shut-off valves 141a and 141b, the fluidization shut-off valve 143, and the shut-off valves 151 and 152 described above can be controlled by the controller 161. Specifically, when pressure is applied into the pulverized-coal supply hopper 33, the controller 161 opens the pressurizing shut-off valves 141a and 141b to supply nitrogen gas from the pressurizing-gas supply line 111 and the pressurizing-gas supply branch line 112 to the first injection nozzles 145 and the second injection nozzles 148, and causes the nitrogen gas to be injected from all the injection nozzles 145 and 148 into the cone portion 33b of the pulverized-coal supply hopper 33. When pulverized coal in the pulverized-coal supply hopper 33 is conveyed to the gasifier 134 through the coal supply line 36, the controller 161 opens the fluidization shut-off valve 143 to supply nitrogen gas only to the second injection nozzles 148 from the fluidization-gas supply line 121 and the fluidization-gas supply branch line 124, and causes the nitrogen gas to be injected only from the second injection nozzles 148 into the cone portion 33b of the pulverized-coal supply hopper 33 to fluidize the pulverized coal.

As nitrogen gas is supplied into the pulverized-coal supply hopper 33 for fluidization and pulverized coal thus fluidized in the pulverized-coal supply hopper 33 is discharged to the coal supply line 36, the amount of pulverized coal in the pulverized-coal supply hopper 33 decreases, and the storage level (the upper surface of the pulverized coal) accordingly lowers. When the upper surface of the pulverized coal stored in the pulverized-coal supply hopper 33 lowers to the height of the cone portion 33b, and if nitrogen gas for fluidization is injected from both the first injection nozzles 145 and the second injection nozzles 148, nitrogen gas injected from the first injection nozzles 145 disposed on the upper part of the cone portion 33b will pass through the pulverized coal to the upper surface side, which makes it difficult to uniformly fluidize the pulverized coal. In view of this, during conveyance of pulverized coal, nitrogen gas is injected only from the second injection nozzles 148 into the cone portion 33b of the pulverized-coal supply hopper 33. Accordingly, the nitrogen gas injected from the second injection nozzles 148 disposed on the lower part of the cone portion 33b is prevented from passing through the pulverized coal to the upper surface side, and thus the pulverized coal can be fluidized uniformly.

As described above, the pulverized-fuel supply unit of the first embodiment includes the pulverized-coal supply hoppers 33, 34, and 35 each having a hollow shape; the first injection nozzles 145 provided to each of the cone portions 33b, 34b, and 35b of the pulverized-coal supply hoppers 33, 34, and 35; the second injection nozzles 148 provided, below the first injection nozzles 145, to a vertically lower part of each of the cone portions 33b, 34b, and 35b of the pulverized-coal supply hoppers 33, 34, and 35; the pressurizing-gas supply line 111 for supplying nitrogen gas for pressurization to the first injection nozzles 145 and the second injection nozzles 148; the fluidization-gas supply line 121 for supplying nitrogen gas for fluidization only to the second injection nozzles 148; and the coal supply lines 36, 37, and 38 provided to vertically lower parts of the pulverized-coal supply hoppers 33, 34, and 35.

Accordingly, when nitrogen gas for pressurization is supplied from the pressurizing-gas supply line 111 into the first injection nozzles 145 and the second injection nozzles 148, the nitrogen gas is supplied from the respective first injection nozzles 145 and the respective second injection nozzles 148 into the pulverized-coal supply hoppers 33, 34, and 35, and thus the internal pressure can be increased to a predetermined supply pressure in a short time. While the internal pressure of the pulverized-coal supply hoppers 33, 34, and 35 is being kept at this supply pressure, when nitrogen gas for fluidization is supplied from the fluidization-gas supply line 121 into the second injection nozzles 148, the nitrogen gas is supplied from the respective second injection nozzles 148 into the vertically lower parts of the cone portions 33b, 34b, and 35b of the pulverized-coal supply hoppers 33, 34, and 35. Thus, pulverized coal in the cone portions of the pulverized-coal supply hoppers 33, 34, and 35 can be efficiently fluidized, and the pulverized coal can be conveyed to the coal supply lines 36, 37, and 38. During conveyance of this pulverized coal, the nitrogen gas is supplied only into the lower parts of the cone portions 33b, 34b, and 35b of the pulverized-coal supply hoppers 33, 34, and 35 to which the coal supply lines 36, 37, and 38 are respectively connected. Thus, even when the amount of pulverized coal in the pulverized-coal supply hoppers 33, 34, and 35 becomes small, it is difficult for the nitrogen gas to pass vertically upward through the pulverized coal in the pulverized-coal supply hoppers 33, 34, and 35. Consequently, pulverized coal in the pulverized-coal supply hoppers 33, 34, and 35 can be efficiently fluidized by nitrogen gas, and a required amount of pulverized coal can be stably supplied to the gasifier 134.

In the pulverized-fuel supply unit of the first embodiment, the amount of nitrogen gas for fluidization to be supplied from the fluidization-gas supply line 121 to the respective second injection nozzles 148 is set smaller than the amount of nitrogen gas to be supplied from the pressurizing-gas supply line 111 to the respective first injection nozzles 145 and the respective second injection nozzles 148. In order to increase the pressure in the pulverized-coal supply hoppers 33, 34, and 35, a large amount of gas needs to be supplied in a shorter time because the waiting time is wanted to be reduced. By contrast, in order to fluidize pulverized coal in the pulverized-coal supply hoppers 33, 34, and 35, a small amount of gas needs to be supplied. In view of this, these supply lines 111 and 121 are provided as separate lines and the amount of nitrogen gas for fluidization is set small, and thus the waiting time and the amount of nitrogen gas usage can be reduced, so that the pulverized fuel can be optimally fed.

In the pulverized-fuel supply unit of the first embodiment, the first injection nozzles 145 are disposed on each of the vertically upper parts of the cone portions 33b, 34b, and 35b of the pulverized-coal supply hoppers 33, 34, and 35 at predetermined intervals in the circumferential direction with the gas connecting line 146 connecting therebetween, and the second injection nozzles 148 are disposed on each of the vertically lower parts of the cone portions 33b, 34b, and 35b of the pulverized-coal supply hoppers 33, 34, and 35 at predetermined intervals in the circumferential direction with the gas connecting line 149 connecting therebetween. Accordingly, by providing the first and second injection nozzles 145 and 148 in upper and lower two stages to each of the cone portions 33b, 34b, and 35b, pulverized coal in the pulverized-coal supply hoppers 33, 34, and 35 is prevented from adhering to a wall surface and stagnating when pressurizing gas is supplied, and nitrogen gas for fluidization is supplied into the vertically lower parts of the pulverized-coal supply hoppers 33, 34, and 35 by the second injection nozzles 148. Consequently, even when the amount of pulverized coal in the pulverized-coal supply hoppers 33, 34, and 35 becomes small, the pulverized coal can be efficiently fluidized, a required amount of pulverized coal can be fed to the gasifier 134, and the amount of nitrogen gas usage can be reduced.

In the pulverized-fuel supplying method of the first embodiment, when pressure is applied into the pulverized-coal supply hoppers 33, 34, and 35, nitrogen gas is supplied from the pressurizing-gas supply line 111, and during conveyance of pulverized coal in the pulverized-coal supply hoppers 33, 34, and 35, nitrogen gas is supplied only from the fluidization-gas supply line 121. Thus, during conveyance of pulverized coal, nitrogen gas is supplied only into the vertically lower parts of the pulverized-coal supply hoppers 33, 34, and 35 to which the coal supply lines 36, 37, and 38 are connected. Thus, even when the amount of pulverized coal in the pulverized-coal supply hoppers 33, 34, and 35 becomes small, it is difficult for the nitrogen gas to pass vertically upward through the pulverized coal in the pulverized-coal supply hoppers 33, 34, and 35. Consequently, the pulverized coal in the pulverized-coal supply hoppers 33, 34, and 35 can be efficiently fluidized by the nitrogen gas, and a required amount of pulverized coal can be stably supplied to the gasifier 134.

The integrated coal gasification combined cycle of the first embodiment includes the pulverized-coal supply unit 12 that supplies pulverized coal obtained by pulverizing coal; the coal gasification unit 13 that gasifies the pulverized coal supplied by the pulverized-coal supply unit 12 to generate flammable gas; the gas clean-up unit 15 that removes impurities from the flammable gas generated by the coal gasification unit 13 to clean the gas; the gas turbine unit 16 that burns mixed gas of compressed air and the flammable gas cleaned by the gas clean-up unit 15 to rotate and drive the turbine 63; the heat recovery steam generator 19 that generates steam by using flue gas from the gas turbine unit 16; and the steam turbine unit 17 that rotates and drives the turbine 69 by using the steam generated by the heat recovery steam generator 19. Accordingly, in the pulverized-coal supply unit 12, during conveyance of pulverized coal, nitrogen gas is supplied only to the vertically lower parts of the pulverized-coal supply hoppers 33, 34, and 35 to which the coal supply lines 36, 37, and 38 are connected. Thus, even when the amount of pulverized coal in the pulverized-coal supply hoppers 33, 34, and 35 becomes small, it is difficult for the nitrogen gas to pass upward through the pulverized coal in the pulverized-coal supply hoppers 33, 34, and 35. Thus, the pulverized coal in the pulverized-coal supply hoppers 33, 34, and 35 can be efficiently fluidized by the nitrogen gas, and a required amount of pulverized coal can be stably supplied to the gasifier 134. Consequently, the coal gasification unit 13 can be stably operated.

Second Embodiment

Figure 4:
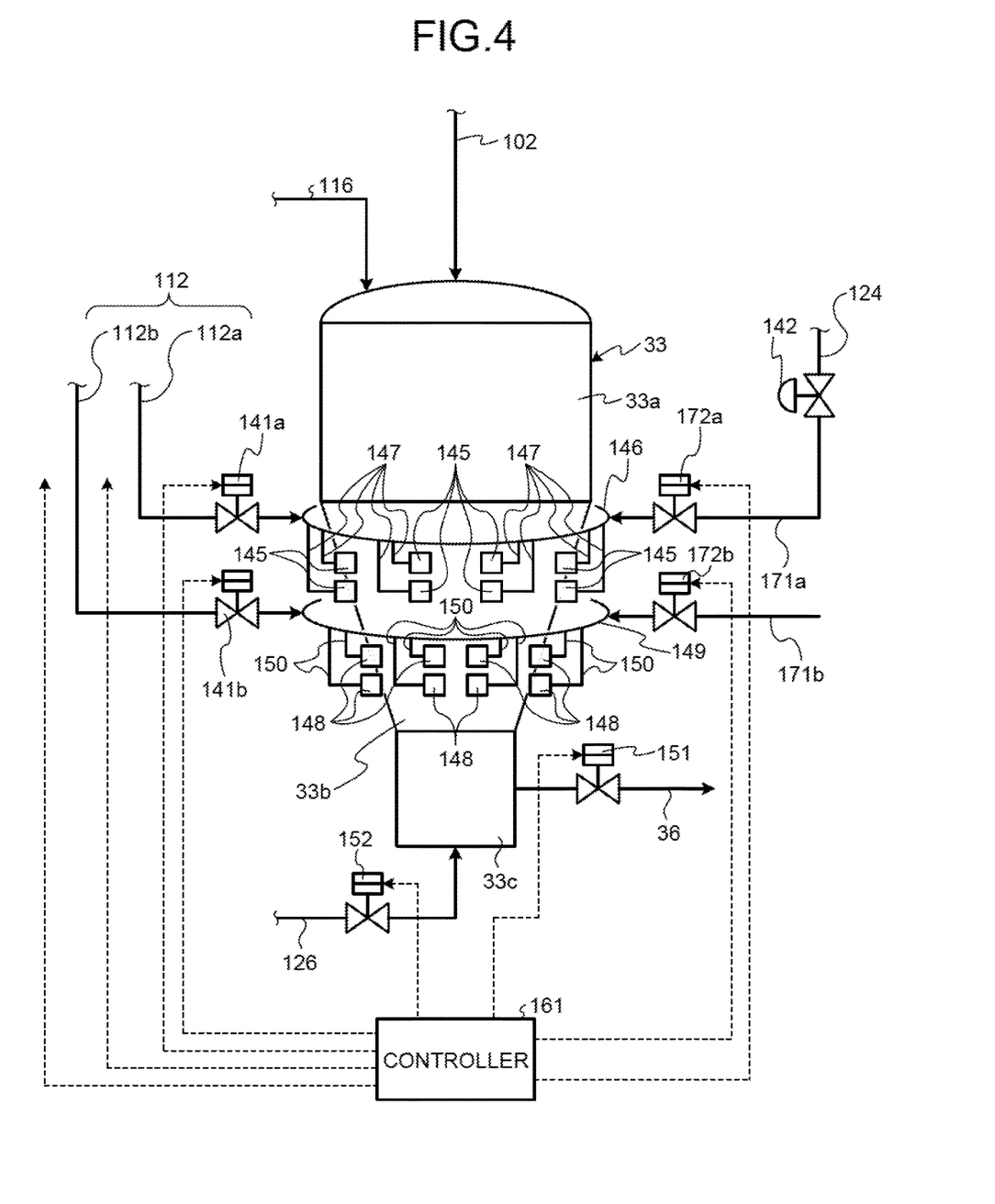
FIG. 4 is a schematic configuration diagram illustrating nitrogen-gas supply channels to the pulverized-coal supply hopper in a pulverized-fuel supply unit of a second embodiment.

FIG. 4 is a schematic configuration diagram illustrating nitrogen-gas supply channels to a pulverized-coal supply hopper in a pulverized-fuel supply unit of a second embodiment. Herein, components having the same functions as those in the first embodiment described above are designated by the same reference signs, and detailed description thereof is omitted.

In the second embodiment, as depicted in FIG. 4, the pressurizing-gas supply branch lines 112a and 112b are respectively provided with the pressurizing shut-off valves 141a and 141b each configured to start and stop supplying nitrogen gas to the cone portion 33b of the pulverized-coal supply hopper 33. The fluidization-gas supply branch line 124 branches into two fluidization-gas supply branch lines 171a and 171b, which are respectively provided with fluidization shut-off valves (a first open/close valve and a second open/close valve) 172a and 172b each configured to start and stop supplying nitrogen gas to the cone portion 33b of the pulverized-coal supply hopper 33. Furthermore, the fluidization flow regulating valve 142 is provided upstream thereof and may control the flow rate as required.

The pulverized-coal supply hopper 33 is provided with the first injection nozzles 145 and the second injection nozzles 148 on the cone portion 33b. Around an upper part of the cone portion 33b of the pulverized-coal supply hopper 33, the gas connecting line 146 is disposed, to which the respective first injection nozzles 145 are coupled via the corresponding gas branch lines 147. Around a vertically lower part of the cone portion 33b of the pulverized-coal supply hopper 33, the gas connecting line 149 is disposed, to which the respective second injection nozzles 148 are coupled via the corresponding gas branch lines 150.

The pressurizing-gas supply branch line 112a is coupled to the gas connecting line 146, and the pressurizing-gas supply branch line 112b is coupled to the gas connecting line 149. The fluidization-gas supply branch line 171a is coupled to the gas connecting line 146, and the fluidization-gas supply branch line 171b is coupled to the gas connecting line 149. Thus, nitrogen gas as pressurizing gas from the pressurizing-gas supply branch line 112 is injected into the pulverized-coal supply hopper 33 from the first injection nozzles 145 and the second injection nozzles 148, and nitrogen gas as fluidization gas from the fluidization-gas supply branch line 124 is injected into the pulverized-coal supply hopper 33 from the first injection nozzles 145 and the second injection nozzles 148.

Thus, when the fluidization shut-off valves 172a and 172b are opened, nitrogen gas in the fluidization-gas tank provided to the outlet of the air separation unit 42 (see FIG. 3), for example, is supplied respectively through the fluidization-gas supply branch lines 171a and 171b to the respective first injection nozzles 145 and the respective second injection nozzles 148, and the nitrogen gas can be injected from all the injection nozzles 145 and 148 into the cone portion 33b of the pulverized-coal supply hopper 33. When the fluidization shut-off valve 172b is opened and the fluidization shut-off valve 172a is closed, nitrogen gas in the fluidization-gas tank provided to the outlet of the air separation unit 42 (see FIG. 3), for example, is supplied through the fluidization-gas supply branch line 171b only to the respective second injection nozzles 148, and the nitrogen gas can be injected only from the respective second injection nozzles 148 into the vertically lower part of the cone portion 33b of the pulverized-coal supply hopper 33.

Control of opening and closing various valves as described above is performed by the controller 161. In other words, opening and closing of the pressurizing shut-off valves 141a and 141b, the shut-off valves 151 and 152, and the fluidization shut-off valves 172a and 172b described above can be controlled by the controller 161. Specifically, when pressure is applied into the pulverized-coal supply hopper 33, the controller 161 opens the pressurizing shut-off valves 141a and 141b to supply nitrogen gas from the pressurizing-gas supply branch lines 112a and 112b to the first injection nozzles 145 and the second injection nozzles 148, and causes the nitrogen gas to be injected from all the injection nozzles 145 and 148 into the cone portion 33b of the pulverized-coal supply hopper 33. When pulverized coal in the pulverized-coal supply hopper 33 is conveyed to the gasifier 134 through the coal supply line 36, the controller 161 opens the fluidization shut-off valves 172a and 172b to supply nitrogen gas from the fluidization-gas supply branch lines 171a and 171b to the first injection nozzles 145 and the second injection nozzles 148, and causes the nitrogen gas to be injected from all the injection nozzles 145 and 148 into the cone portion 33b of the pulverized-coal supply hopper 33 to fluidize the pulverized coal.

As nitrogen gas is supplied into the pulverized-coal supply hopper 33 to fluidize pulverized coal and the pulverized coal in the pulverized-coal supply hopper 33 is discharged to the coal supply line 36, the amount of pulverized coal in the pulverized-coal supply hopper 33 decreases, and the storage level (the upper surface of the pulverized coal) accordingly lowers. When the upper surface of the pulverized coal stored in the pulverized-coal supply hopper 33 lowers to the height of the cone portion 33b, and if nitrogen gas for fluidization is injected from both the first injection nozzles 145 and the second injection nozzles 148, nitrogen gas injected from the first injection nozzles 145 disposed on the upper part of the cone portion 33b will pass through the pulverized coal to the upper surface side, which makes it difficult to uniformly fluidize the pulverized coal. In view of this, when the amount of pulverized coal in the pulverized-coal supply hopper 33 decreases below a predetermined lower limit during conveyance of pulverized coal in the pulverized-coal supply hopper 33, the controller 161 stops injection of fluidization gas from the first injection nozzles 145 into the pulverized-coal supply hopper 33.

Specifically, the controller 161 opens the fluidization shut-off valves 172a and 172b when the amount of the pulverized coal in the pulverized-coal supply hopper 33 is larger than the predetermined lower limit, and closes the fluidization shut-off valve 172a while leaving the fluidization shut-off valve 172b open when the amount of pulverized coal in the pulverized-coal supply hopper 33 decreases below the predetermined lower limit. Accordingly, injection of nitrogen gas from the first injection nozzles 145 into the cone portion 33b of the pulverized-coal supply hopper 33 is stopped, and nitrogen gas is injected only from the second injection nozzles 148 into the cone portion 33b of the pulverized-coal supply hopper 33. Thus, the nitrogen gas injected from the second injection nozzles 148 disposed on the vertically lower part of the cone portion 33b is prevented from passing through the pulverized coal to the upper surface side, and consequently, the pulverized coal can be fluidized uniformly.

The predetermined lower limit may be set to such an amount that, for example, the upper surface of stored pulverized coal reaches the boundary between the body portion 33a and the cone portion 33b. As for the position of pulverized coal, the position of the upper surface of stored pulverized coal can be monitored by providing a pulverized-coal level gage using γ rays, for example, in the pulverized-coal supply hopper 33.

As described above, in the pulverized-fuel supply unit of the second embodiment, when the amount of pulverized coal in the pulverized-coal supply hoppers 33, 34, and 35 decreases below the predetermined lower limit during conveyance of pulverized coal in the pulverized-coal supply hoppers 33, 34, and 35, injection of nitrogen gas for fluidization from the first injection nozzles 145 is stopped.

Accordingly, when the remaining amount of pulverized coal is large, nitrogen gas is injected from both the first injection nozzles 145 and the second injection nozzles 148 into the cone portions 33b, 34b, and 35b of the pulverized-coal supply hoppers 33, 34, and 35, and thus a required amount of pulverized coal can be efficiently fluidized to be stably fed to the gasifier 134. When the remaining amount of pulverized coal is small, nitrogen gas is injected only from the second injection nozzles 148 at vertically lower part into the pulverized-coal supply hoppers 33, 34, and 35, whereby the nitrogen gas can be prevented from passing through the pulverized coal in the pulverized-coal supply hoppers 33, 34, and 35 and flowing out upward, and the pulverized coal can be more efficiently fluidized.

In the pulverized-fuel supply unit of the second embodiment, the fluidization-gas supply branch line 171a that branches off from the fluidization-gas supply branch line 124 is coupled to the first injection nozzles 145, the fluidization shut-off valve 172a is provided, the fluidization-gas supply branch line 171b that branches off from the fluidization-gas supply branch line 124 is coupled to the second injection nozzles 148, and the fluidization shut-off valve 172b is provided. The controller 161 opens the respective fluidization shut-off valves 172a and 172b when the amount of pulverized coal in the pulverized-coal supply hoppers 33, 34, and 35 is equal to or larger than the predetermined lower limit, and closes the fluidization shut-off valve 172a when the amount of the pulverized coal in the pulverized-coal supply hoppers 33, 34, and 35 decreases below the predetermined lower limit.

Accordingly, by providing the fluidization-gas supply branch lines 171a and 171b and the fluidization shut-off valves 172a and 172b respectively for the first injection nozzles 145 and the second injection nozzles 148 on a dedicated basis, the injection amount of nitrogen gas can be easily changed depending on the remaining amount of pulverized coal in the pulverized-coal supply hoppers 33, 34, and 35.

In the first embodiment described above, the fluidization open/close valve 144 of the fluidization-gas supply branch line 124 is a manual valve. However, this valve may be a control valve opening and closing of which can be controlled by the controller 161. In the second embodiment, the fluidization shut-off valves 172a and 172b of the fluidization-gas supply branch lines 171a and 171b are control valves. However, these valves may be manual valves.

In the embodiments described above, the injection nozzles 145 and 148 are configured in upper and lower two stages. However, these nozzles may be configured in upper and lower three or more stages.

In the embodiments, the three pulverized-coal supply hoppers 33, 34, and 35 are provided for the pulverized-coal bin 32. However, the number thereof is not limited to this, and two pulverized-coal supply hoppers or four or more pulverized-coal supply hoppers may be provided.

In the embodiments, coal is used as fuel. However, high rank coal or low rank coal may be used. Alternatively, not limited to coal, biomass used as renewable organic resources of biological origin may be used, and examples thereof that can be used include lumber from thinning, discarded lumber, driftwood, grass, waste, sludge, tires, and recycled fuel (pellets or chips) using these materials as raw materials.

REFERENCE SIGNS LIST

10 Integrated coal gasification combined cycle (integrated gasification combined cycle)
11 Coal feeding unit
12 Pulverized-coal supply unit (pulverized-fuel supply unit)
13 Coal gasification unit
14 Char recovery unit
15 Gas clean-up unit
16 Gas turbine unit
17 Steam turbine unit
18 Generator
19 Heat recovery steam generator
31 Coal pulverizer
32 Pulverized-coal bin
33, 34, 35 Pulverized-coal supply hopper
36, 37, 38 Coal supply line
102, 103, 104 Pulverized-coal discharge line
111 Pressurizing-gas supply line (pressurizing-gas supply device, gas supply device)
112, 112a, 112b, 113, 114 Pressurizing-gas supply branch line
115 Pressure-regulating-gas supply line
116, 117, 118 Pressure-regulating gas supply branch line
121, 125 Fluidization-gas supply line (fluidization-gas supply device, gas supply device)
122, 123, 124, 126, 127, 128, 171a, 171b Fluidization-gas supply branch line
131 Distributor
132 Pulverized-coal supply line
133 Burner
134 Gasifier
141a, 141b Pressurizing shut-off valve
142 Fluidization flow regulating valve
143, 172a, 172b Fluidization shut-off valve (open/close valve)
144 Fluidization open/close valve
145 First injection nozzle
146 Gas connecting line
147 Gas branch line
148 Second injection nozzle
149 Gas connecting line
150 Gas branch line
151, 152 Shut-off valve
161 Controller

The invention claimed is:

1. A pulverized-fuel supply unit comprising:
a hopper having a hollow shape to store therein pulverized fuel;
a plurality of first nozzles provided in the hopper at a first position in a vertical direction of the hopper;
a plurality of second nozzles provided in the hopper at a second position in the vertical direction, the second position being lower than the first position;
a pressurizing-gas supply device configured to supply pressurizing gas to increase internal pressure of the hopper;
a fluidization-gas supply device configured to supply fluidization gas to fluidize the pulverized fuel in the hopper; and
a pulverized-fuel supply line provided to the hopper at a third position in the vertical direction, the third position being lower than the second position, wherein
the pressurizing-gas supply device supplies pressurizing gas to the plurality of first nozzles and the plurality of second nozzles,
the fluidization-gas supply device supplies fluidization gas to the plurality of second nozzles,
the plurality of first nozzles are arranged at predetermined intervals in a circumferential direction of the hopper, and
the plurality of second nozzles are arranged at predetermined intervals in the circumferential direction.

2. The pulverized-fuel supply unit according to claim 1, wherein a flow rate of gas supplied by the fluidization-gas supply device is lower than a flow rate of gas supplied by the pressurizing-gas supply device.

3. The pulverized-fuel supply unit according to claim 1, wherein
the hopper includes a body portion that has a cylindrical shape and a closed upper end; a cone portion that is coupled to a vertically lower part of the body portion and tapers vertically downward; and a chamber portion that is coupled to a vertically lower part of the cone portion and has a closed lower end.

4. An integrated gasification combined cycle comprising:
the pulverized-fuel supply unit according to claim 1 to supply pulverized fuel obtained by pulverizing carbonaceous feedstock;
a gasification unit configured to gasify the pulverized fuel supplied from the pulverized-fuel supply unit to generate flammable gas;
a gas clean-up unit configured to remove impurities from the flammable gas generated by the gasification unit to clean the flammable gas;
a gas turbine unit configured to burn mixed gas of compressed air and at least part of the flammable gas cleaned by the gas clean-up unit to rotate and drive a turbine;
a heat recovery steam generator configured to generate steam by using flue gas from the gas turbine unit; and
a steam turbine unit configured to rotate and drive a turbine by using the steam generated by the heat recovery steam generator.

5. A pulverized-fuel supply unit comprising:
a hopper having a hollow shape to store therein pulverized fuel;
a plurality of first nozzles provided in the hopper at a first position in a vertical direction of the hopper;
a plurality of second nozzles provided in the hopper at a second position in the vertical direction, the second position being lower than the first position;

a pressurizing-gas supply device configured to supply pressurizing gas to increase internal pressure of the hopper;

a fluidization-gas supply device configured to supply fluidization gas to fluidize the pulverized fuel in the hopper; and a pulverized-fuel supply line provided to the hopper at a third position in the vertical direction, the third position being lower than the second position, wherein the pressurizing-gas supply device supplies pressurizing gas to the plurality of first nozzles and the plurality of second nozzles, the fluidization-gas supply device supplies fluidization gas to the plurality of first nozzles and the plurality of second nozzles, and the pulverized-fuel supply unit includes a controller configured to cause the fluidization-gas supply device to stop injection of fluidization gas from the plurality of first nozzles when the amount of the pulverized fuel in the hopper decreases below a predetermined lower limit during conveyance of pulverized fuel from the hopper.

6. The pulverized-fuel supply unit according to claim 5, wherein the fluidization-gas supply device includes a fluidization-gas supply line; a first fluidization-gas supply line that branches off from the fluidization-gas supply line and is connected to the plurality of first nozzles; a first open/close valve provided to the first fluidization-gas supply line; a second fluidization-gas supply line that branches off from the fluidization-gas supply line and is connected to the plurality of second nozzles; and a second open/close valve provided to the second fluidization-gas supply line, and the controller opens the first open/close valve and the second open/close valve when the amount of the pulverized fuel in the hopper is equal to or larger than the lower limit, and closes the first open/close valve when the amount of the pulverized fuel in the hopper decreases below the lower limit.

7. A pulverized-fuel supplying method performed in a pulverized-fuel supply unit that includes a hopper having a hollow shape to store therein pulverized fuel; a plurality of first nozzles provided in the hopper at a first position in a vertical direction of the hopper; a plurality of second nozzles provided in the hopper at a second position in the vertical direction, the second position being lower than the first position; a pressurizing-gas supply device configured to supply pressurizing gas to increase internal pressure of the hopper; a fluidization-gas supply device configured to supply fluidization gas to fluidize the pulverized fuel in the hopper; and a pulverized-fuel supply line provided to the hopper at a third position in the vertical direction, the third position being lower than the second position, the pressurizing-gas supply device supplying pressurizing gas to the first nozzles and the second nozzles, the fluidization-gas supply device supplying fluidization gas to the second nozzles, the method comprising:

activating the pressurizing-gas supply device to apply pressure into the hopper; and activating the fluidization-gas supply device to convey the pulverized fuel from the hopper, wherein the plurality of first nozzles are arranged at predetermined intervals in a circumferential direction of the hopper, and the plurality of second nozzles are arranged at predetermined intervals in the circumferential direction.

* * * * *